United States Patent
Toyoda et al.

(10) Patent No.: US 8,057,745 B2
(45) Date of Patent: Nov. 15, 2011

(54) CATALYST SYSTEM FOR VEHICLE EXHAUST GAS PURIFICATION DEVICES, EXHAUST GAS PURIFICATION DEVICE USING THE SAME, AND METHOD FOR PURIFICATION OF EXHAUST GASES

(75) Inventors: Yasunori Toyoda, Osaka (JP); Yoshiro Hirasawa, Numazu (JP); Katsuaki Kato, Numazu (JP)

(73) Assignees: Daiichi Kigenso Kagaku Kogyo Co., Ltd., Osaka (JP); N.E. Chemcat Corporation, Tokyo (JP)

( * ) Notice: Subject to any disclaimer, the term of this patent is extended or adjusted under 35 U.S.C. 154(b) by 1097 days.

(21) Appl. No.: 11/901,009

(22) Filed: Sep. 13, 2007

(65) Prior Publication Data

US 2008/0066458 A1 Mar. 20, 2008

(30) Foreign Application Priority Data

Sep. 15, 2006 (JP) .................. 2006-250514

(51) Int. Cl.
*B01D 50/00* (2006.01)
(52) U.S. Cl. ........ 422/171; 422/177
(58) Field of Classification Search ............ 422/177, 422/180; 502/304
See application file for complete search history.

(56) References Cited

U.S. PATENT DOCUMENTS

2007/0155624 A1* 7/2007 Wakita et al. ............. 502/304

FOREIGN PATENT DOCUMENTS

| EP | 1378489 | 1/2004 |
|---|---|---|
| EP | 1712279 | 10/2006 |
| JP | 63-116741 | 5/1988 |
| JP | 07-144119 | 6/1995 |
| JP | 10-192713 | 7/1998 |
| JP | 11-123331 | 5/1999 |
| WO | WO-2006/030763 A1 | 3/2006 |
| WO | WO 2006030763 A1 * | 3/2006 |

OTHER PUBLICATIONS

European Search Report dated Feb. 4, 2008, issued with respect to the corresponding European counterpart (7 sheets).

* cited by examiner

*Primary Examiner* — Tom Duong
(74) *Attorney, Agent, or Firm* — Edwards Wildman Palmer LLP; James E. Armstrong, IV; Nicholas J. DiCeglie, Jr.

(57) ABSTRACT

The present invention provides a catalyst system for vehicle exhaust gas purification devices which exhibit excellent capacity of removing nitrogen oxide emissions from internal combustion engine exhaust gases when they are brought into contact with the catalyst even when hydrocarbon concentration in exhaust gases varies, exhaust gas purification device using the same and method for purification of exhaust gases. The catalyst system for vehicle exhaust gas purification devices comprises two or more exhaust gas purification catalysts including two different exhaust gas purification catalysts (first and second catalysts), each supported on an inorganic structural carrier and disposed in an exhaust gas passage, wherein the first catalyst is located on the upstream side in the exhaust gas passage, and the second downstream-side catalyst contains a cerium/zirconium-base compound oxide (A), prepared by melting a starting mixture at its melting point or higher, the molten mixture being then cooled to produce an ingot and crushed.

17 Claims, 4 Drawing Sheets

CATALYST SYSTEM FOR VEHICLE EXHAUST GAS PURIFICATION DEVICES, EXHAUST GAS PURIFICATION DEVICE USING THE SAME, AND METHOD FOR PURIFICATION OF EXHAUST GASES

BACKGROUND OF THE INVENTION

1. Field of the Invention

The present invention relates to a catalyst system for vehicle exhaust gas purification devices, exhaust gas purification device using the same and method for purification of exhaust gases, more specifically a catalyst system for vehicle exhaust gas purification devices which exhibit excellent capacity of removing nitrogen oxide emissions from vehicle exhaust gases when they are brought into contact with the catalyst even when hydrocarbon concentration in exhaust gases varies, exhaust gas purification device using the same and method for purification of exhaust gases.

2. Description of the Prior Art

Exhaust gases discharged from combustion devices, e.g., vehicle internal combustion engines or the like and boilers, contain hazardous substances, e.g., hydrocarbons (HC), carbon monoxide (CO) and nitrogen oxides (NOx), and various techniques have been proposed for purification of these hazardous substances. As one of these techniques, one which has been studied disposes a catalyst in an exhaust gas passage to purify hazardous components of exhaust gases.

In particular, such a catalytic technique, when applied to purification of exhaust gases discharged from vehicles, is required to efficiently purify these hazardous gases (CO, HC and NOx) while flexibly coping with rapidly changing concentrations of these gases, ranging from several ppm to several %.

In the catalytic exhaust gas purification techniques, oxygen present in exhaust gases plays important roles for promotion of CO and HC oxidation and NOx reduction. It is however difficult for a vehicle to keep constant engine combustion conditions, because of changing driving conditions resulting from changing traffic conditions, with the result that oxygen concentration changes every second. Therefore, purification of hazardous gases by using oxygen will have a deteriorated purification efficiency, when oxygen concentration drops.

In order to cope with these situations, the catalyst is incorporated with an oxygen storage/release component (hereinafter sometimes referred to as OSC), which releases oxygen which it stores into exhaust gases containing oxygen at an insufficient concentration, to improve hazardous gas purification capacity.

$CeO_2$ powder has been used for an OSC, because of its high oxygen storage/release capacity, and demonstrating an effect of improving exhaust gas purification efficiency. Extensive studies have been made on improvement of oxygen storage capacity and release characteristics of $CeO_2$-base powders, e.g., $CeO_2/ZrO_2$-base powder, and also on exhaust gas purification catalysts which are incorporated with an OSC as a promoter.

It is discussed that a cerium/zirconium-base compound oxide of specific atomic composition is effective as an oxygen storage/release component for adjusting exhaust gas purification catalyst functions of oxidation of HC and CO and reduction of NOx.

An exhaust gas purification catalyst mounted in a vehicle is disposed under a floor, at which temperature is relatively low, or immediately below the engine where it is exposed to higher temperature of exhaust gases immediately after being discharged from the engine. Exhaust gases, which are at high temperature immediately after being discharged from an engine, lose temperature when they reach the underfloor area. These conditions are not favorable for exhaust gas purification, because many exhaust gas purification catalysts generally exhibit a high activity at above a certain temperature. Nevertheless, however, a catalyst disposed under a vehicle floor is required to exhibit purification capacity even under decreased temperature conditions.

On the other hand, the one disposed immediately under an engine may have the exhaust gas purification catalyst components sintered when exposed to exhaust gases which may be at above 1000° C. Therefore, such a catalyst is required to have a stable exhaust gas purification capacity even under severe high-temperature conditions by suppressing sintering of the components.

One type of these catalysts simultaneously performs oxidation of CO and HC and reduction of NOx for purification of exhaust gases. Such a catalyst is known as a three-way catalyst (TWC) (a device in which a TWC is mounted is hereinafter sometimes referred to as a TWC device). The TWCs generally have a structure with a structural carrier of cordierite, which is coated with a slurry comprising a base material for a porous carrier (e.g., of alumina) impregnated with a noble metal, e.g., platinum, rhodium, palladium or the like.

Such a TWC removes a reducing component such as CO, HC or the like by oxidation with oxygen in exhaust gases and NOx by reduction. As discussed above, however, oxygen concentration in exhaust gases changes every second, and catalysts exhibiting a purification capacity under these conditions are in demand. Therefore, an exhaust gas purification catalyst is incorporated with cerium oxide, cerium/zirconium-base compound oxide (Patent Document 1) as an oxygen storage/release material to improve its hazardous component purification capacity by releasing oxygen which it stores into exhaust gases to increase oxygen content of exhaust gases containing oxygen at an insufficient concentration. Incorporation of an oxygen storage/release material is mainly intended to reduce extent of oxygen concentration changes.

However, the markets are demanding OSC materials capable of release oxygen in a lower temperature range, having a higher oxygen storage/release capacity and securing a longer service life of the catalysts in which they are incorporated to cope with the exhaust gas regulations, which are becoming more and more stringent. At the same time, exhaust gas purification catalysts are required to be more resistant to temperature. Under these situations, the inventors of the present invention have developed an OSC material exhibiting an excellent performance even at a high temperature, and proposed a cerium/zirconium-base compound oxide which is not sintered at a high temperature of 1000° C. or higher (Patent Document 2).

In some cases, catalysts exhibiting different functions in accordance with exhaust gas components to be purified are disposed at different places in a vehicle exhaust gas passage to constitute a vehicle exhaust gas purification device.

Two or more types of TWC themselves are frequently disposed in an exhaust gas passage also in a gasoline engine. For example, Patent Document 3 discloses a device which purifies exhaust gases in two stages, with a more heat-resistant catalyst in the first stage where it is exposed to exhaust gases of higher temperature, and a common TWC in the lower-temperature second stage to completely oxidize HC, which is partly oxidized in the first stage. Patent Document 4 discloses a device working also in two stages with a TWC in the first stage and composite catalyst of HC adsorbent and TWC in the second stage, in an attempt to greatly improve rate of purification of HC in exhaust gases.

When a catalyst is disposed in an exhaust gas passage of limited space and shape, similar catalysts are disposed in two or more places to provide an active area sufficient for exhaust gas purification. For example, Patent Document 4 discloses a TWC device with two or more catalysts to purify exhaust gases.

It is accepted that a conventional TWC can adequately purify three components of HC, CO and NOx only in a narrow theoretical air/fuel ratio range around 14.6 (the range is referred to as a window). However, a vehicle must work under varying conditions resulting from varying driving conditions, discussed earlier, and under lean conditions to improve mileage, in order to cope with heightened interests in environmental problems in these days, where the lean condition may result from a fuel cut condition, under which supply of fuel to a combustion chamber is temporarily suspended, and also from a lean-burning condition. At a high theoretical air/fuel ratio, NOx is produced more and difficult for a conventional TWC to purify.

Vehicles of improved fuel economy have been demanded also viewed from depletion trends of oil resources and global warming, and lean-combustion engines have been attracting more attention also for gasoline engines. In lean combustion, an exhaust gas atmosphere created by a vehicle being driven is slanted to an oxygen-rich state (sometimes referred to as lean atmosphere) from that associated with combustion at the theoretical air/fuel ratio (sometimes referred to as stoichiometric condition). A conventional TWC, when it works in a lean atmosphere, involves a problem of insufficient NOx purification, because NOx is produced more in such an atmosphere of higher oxygen concentration. Therefore, catalysts which can purify NOx even in a lean atmosphere have been studied (refer, e.g., to Patent Document 5).

More recently, however, vehicles have been demanded to have still improved fuel economy, and driven under lean atmospheres and fuel-cut conditions more frequently. At the same time, upsurge of environmental awareness has been requiring still deeper purification of NOx, and further improvements of NOx purification capacity of TWCs, in particular Patent Document 1: JP-B 6-75675
Patent Document 2: WO2006/030763
Patent Document 3: JP-A 11-123331
Patent Document 4: JP-A 7-144119
Patent Document 5: JP-A-10-192713

SUMMARY OF THE INVENTION

The present invention has been developed to solve the problems described above. The objects of the present invention are to provide a catalyst system for vehicle exhaust gas purification devices which exhibit excellent capacity of removing nitrogen oxide emissions from vehicle exhaust gases by bringing them into contact with the catalyst even when hydrocarbon concentration varies, exhaust gas purification device using the same and method for purification of exhaust gases.

The inventors of the present invention have found, after having extensively studied catalysts for purification of nitrogen oxides (NOx) present in exhaust gases discharged, that a catalyst has excellent characteristics of efficiently decomposing NOx, when incorporated with finely divided cerium/zirconium-base compound oxide, prepared by melting a starting mixture of cerium and zirconium at high temperature of its melting point or higher, the molten mixture being then cooled, crushed and, as required, calcined in an oxidative atmosphere, and that the device disposed in an exhaust gas passages for treating the gases in two stages can simultaneously purify CO, HC and NOx present in the gases when the above catalyst is used as the downstream-side catalyst, achieving the present invention.

The first aspect of the present invention is a catalyst system for an vehicle exhaust gas purification device comprising two or more exhaust gas purification catalysts including two different exhaust gas purification catalysts (first and second catalysts), each supported on an inorganic structural carrier and disposed in an exhaust gas passage in the above order, wherein the first catalyst is located on the upstream side, and the second downstream-side catalyst contains a cerium/zirconium-base compound oxide (A), prepared by melting a starting mixture at its melting point or higher, the molten mixture being then cooled to produce an ingot and crushed.

The second aspect of the present invention is the catalyst system of the first aspect, wherein the first and second catalysts are disposed adjacently.

The third aspect of the present invention is the catalyst system of the first aspect, wherein each of the first and second catalysts has a function of reducing nitrogen oxides (NOx) with hydrocarbons (HC), carbon monoxide (CO) or hydrogen (H).

The fourth aspect of the present invention is the catalyst system of the first aspect, wherein the starting mixture for the cerium/zirconium-base compound oxide (A) is molten under heating for 0.5 to 3 hours.

The fifth aspect of the present invention is the catalyst system of the first aspect, wherein the cerium/zirconium-base compound oxide (A) has a particle diameter of 3 mm or less.

The sixth aspect of the present invention is the catalyst system of the first aspect, wherein the cerium/zirconium-base compound oxide (A) contains cerium and zirconium in a $CeO_2/(ZrO_2+CeO_2)$ molar ratio of 1/9 to 9/1.

The seventh aspect of the present invention is the catalyst system of the first aspect, wherein the second catalyst further contains at least one active metal species (B) selected from the group consisting of platinum, palladium and rhodium.

The eighth aspect of the present invention is the catalyst system of the seventh aspect, wherein the active metal species (B) is supported by at least one species of heat-resistant inorganic oxide (C) selected from the group consisting of zirconia, $\gamma$-$Al_2O_3$ and lanthanum doped $\gamma$-$Al_2O_3$.

The ninth aspect of the present invention is the catalyst system of the eighth aspect, wherein the active metal species (B) contains platinum and the heat-resistant inorganic oxide (C) is composed of lanthanum doped $\gamma$-$Al_2O_3$.

The $10^{th}$ aspect of the present invention is the catalyst system of the first aspect, wherein the inorganic structural carrier is of a honeycomb structure (D).

The $11^{th}$ aspect of the present invention is the catalyst system of the tenth aspect, wherein the second catalyst is deposited at least in 2 layers on the honeycomb structure (D), the lower layer being incorporated with the cerium/zirconium-base compound oxide (A).

The $12^{th}$ aspect of the present invention is the catalyst system of the tenth or $11^{th}$ aspect, wherein the honeycomb structure (D) is a carrier of flow-through type having a cell density of 10 to 1500 cells/inch².

The $13^{th}$ aspect of the present invention is the catalyst system of one of the first to $12^{th}$ aspects, wherein the honeycomb structure (D) supports the cerium/zirconium-base compound oxide (A), active metal species (B) and heat-resistant inorganic oxide (C) as the second catalyst components at 5.0 to 200, 0.01 to 20 and 1 to 300 g per unit volume (L) of the structure (D), respectively.

The 14th aspect of the present invention is the catalyst system of the first aspect, wherein the first catalyst contains a cerium/zirconium complex oxide (A') which is prepared by calcining a starting mixture of cerium and zirconium salts at a temperature at which it is not molten.

The 15th aspect of the present invention is the catalyst system of the 14th aspect, wherein the first catalyst further contains at least one active metal species (B) selected from the group consisting of platinum, palladium and rhodium.

The 16th aspect of the present invention is the catalyst system of the 15th aspect, wherein the active metal species (B) is supported on at least one species of heat-resistant inorganic oxide (C) selected from the group consisting of zirconia, $\gamma$-$Al_2O_3$ and lanthanum doped $\gamma$-$Al_2O_3$.

The 17th aspect of the present invention is the catalyst system of one of the 14th to 16th aspects, wherein the honeycomb structure (D) supports the cerium/zirconium-base compound oxide (A'), active metal species (B) and heat-resistant inorganic oxide (C) as the first catalyst components at 5.0 to 200, 0.01 to 20 and 1 to 300 g per unit volume (L) of the structure (D), respectively.

The 18th aspect of the present invention is a vehicle exhaust gas purification device which uses the catalyst system of one of the first to 17th aspects.

The 19th aspect of the present invention is an exhaust gas purification method using the vehicle exhaust gas purification device of the 18th aspect, wherein exhaust gases discharged from an internal combustion engine are brought into contact with the catalysts disposed in the exhaust gas passage at least at 2 places orderly in the flow direction to decompose nitrogen oxides (NOx) present in the exhaust gases.

The 20th aspect of the present invention is the method of the 19th aspect for exhaust gas purification, wherein nitrogen oxides (NOx) are reduced with hydrocarbons (HC) or carbon monoxide (CO).

The 21st aspect of the present invention is the method of the 19th aspect for exhaust gas purification, wherein the internal combustion engine is a gasoline engine.

The exhaust gas purification device of the present invention can efficiently purify NOx present in vehicle exhaust gases. Moreover, it can purify HC, CO and NOx present in exhaust gases as hazardous components in atmospheres of varying HC content. It can exhibit an excellent NOx purification capacity in particular when used as a TWC device. The capacity is notably observed when the device is used to purify NOx immediately after they are massively produced in an internal combustion engine operating in a lean-combustion condition resulting from fuel cut or the like.

DETAILED DESCRIPTION OF THE INVENTION

The catalyst system for vehicle exhaust gas purification devices, exhaust gas purification device using the same and method for purification of exhaust gases, all of the present invention, are described in detail by referring to the attached drawings.

1. Vehicle Exhaust Gas Purification Device

The catalyst system for the vehicle exhaust gas purification device of the present invention comprises two or more exhaust gas purification catalysts including two different exhaust gas purification catalysts (first and second catalysts), each supported on an inorganic structural carrier and disposed in an exhaust gas passage in the above order, wherein the second downstream-side catalyst contains a cerium/zirconium-base compound oxide (A), prepared by melting a starting mixture at its melting point or higher, the molten mixture being then cooled to produce an ingot and crushed.

The inorganic structural carrier for the present invention is made of silica, alumina, silicon carbide, cordierite or the like formed into a honeycomb shape or pellets. The one formed into a honeycomb shape, in particular, is referred to as an integral structural carrier, and sometimes referred to as an integral structural catalyst when coated with a catalyst component.

Figure 1:
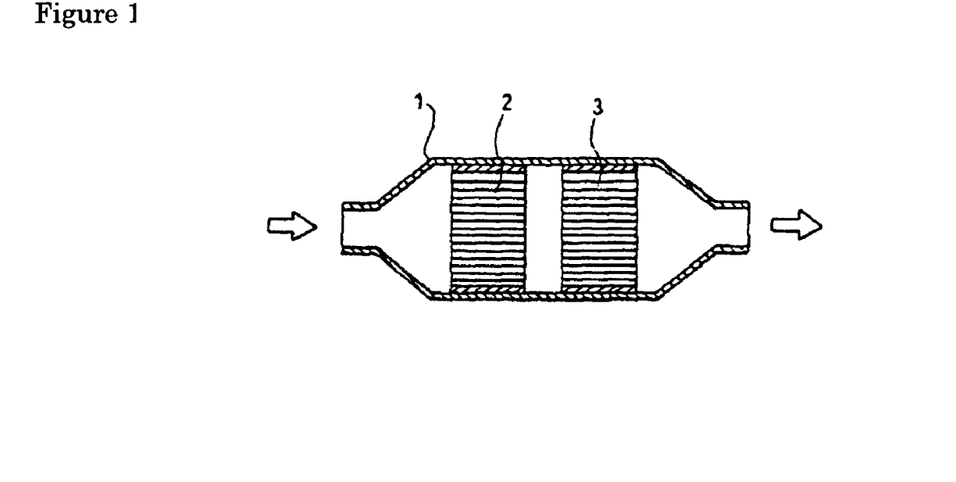
FIG. 1 is a cross-sectional view illustrating a vehicle exhaust gas purification device of the present invention.

FIG. 1 illustrates a common exhaust gas purification device 1, where a structural catalyst (in particular integral structural catalyst) is disposed in an exhaust gas passage when it purifies exhaust gases discharged from a vehicle. In the present invention, two or more exhaust gas purification catalysts, e.g., those capable of purifying nitrogen oxides (NOx) present in exhaust gases, including two different exhaust gas purification catalysts (first upstream-side catalyst 2 and second downstream-side catalyst 3) disposed in this order in the flow direction.

An integral structural catalyst is disposed either in the vicinity of the engine exhaust (directly below type) where it is exposed to high temperature of exhaust gases or under a floor downstream of the engine (underfloor type). The exhaust gas purification catalyst of the present invention may be of a directly below or underfloor type, and can exhibit its effect even when disposed under a floor, where it is exposed to exhaust gases of relatively low temperature. The catalyst containing a cerium/zirconium-base composite oxide (A) is not disposed in the most upstream position but in the second or more downstream position in an exhaust gas passage irrespective of its type. Therefore, it is referred to as a second or downstream-side catalyst. On the other hand, the one disposed in the most upstream position is referred to as a first or upstream-side catalyst.

The services for which the vehicle exhaust gas purification device of the present invention is used include purification of exhaust gas components discharged from common gasoline engines. The major regulated hazardous substances present in exhaust gases discharged from gasoline engines are CO, HC and NOx. The present invention purifies the hazardous components, when applied to these exhaust gases.

The present invention is described mainly taking a TWC which tries to simultaneously purify CO, HC and NOx as a preferred embodiment of the present invention. Referring to FIG. 1, the downstream-side catalyst 3 as a TWC is preferably disposed adjacently to the upstream-side catalyst 2. The TWC reduces nitrogen oxides (NOx) with hydrocarbons (HC), carbon monoxide (CO) or hydrogen (H) produced by steam reforming.

The vehicle exhaust gas purification device of the present invention exhibits its effects when applied to purification of exhaust gases discharged from internal combustion engines, which are known to work under cyclically changed air/fuel ratios, in particular for purification of NOx in exhaust gases. A vehicle is sometimes driven in fuel-cut conditions to improve fuel economy, and it is known that NOx is produced more under these conditions, because of increased air/fuel ratio. The vehicle exhaust gas purification device of the present invention can exhibit its NOx-purification effect notably in particular for exhaust gases discharged immediately after the engine is operated under a fuel-cut condition, to greatly abate NOx emissions. The NOx purification effect is notably observed for purification of exhaust gases produced by a gasoline engine operating in a fuel-cut condition. The notable effect is considered to result from the following phenomena, although not fully substantiated.

Exhaust gases discharged from an internal combustion engine contain hazardous components of HC, CO and NOx whose concentrations vary depending on vehicle driving conditions. Purification of NOx needs a reducing component in exhaust gases, such as HC, CO or hydrogen (H) produced by steam reforming. Sufficient purification may be difficult for exhaust gases produced in a lean atmosphere, resulting from fuel-cut operation or the like, because of increased concentration of NOx and oxygen and decreased HC, CO and H concentrations to increase NOx emissions.

On the other hand, the vehicle exhaust gas purification device of the present invention suppresses rapid changes of exhaust gas component concentrations by the catalyst disposed in the upstream side, with the result that concentrations of HC and CO as reducing components are not decreased significantly even when NOx and oxygen concentrations increase, which will be one of the reasons for promoted exhaust gas purification, in particular for NOx.

As discussed above, the vehicle exhaust gas purification device of the present invention disposes a catalyst containing a cerium/zirconium-base compound oxide (A) as the second catalyst in a downstream side on the exhaust gas passage. The catalyst containing a cerium/zirconium-base compound oxide (A) exhibits its effects more efficiently when disposed downstream of the first upstream-side catalyst than when used individually.

2. Second Catalyst

The second catalyst for the present invention, disposed on downstream side of an exhaust gas passage, contains a cerium/zirconium-base compound oxide (A) supported on an inorganic structural carrier, where the compound oxide (A) is produced by melting a starting mixture at its melting point or higher, the molten mixture being then cooled to produce an ingot and crushed.

The second catalyst has a basic structure containing, in addition to the cerium/zirconium-base compound oxide (A), an active metal species (B) selected from the group consisting of platinum, palladium and rhodium, and heat-resistant inorganic oxide (C) of alumina, titania, zirconia or the like for supporting the active metal species (B) at least partly, where they are supported on a carrier of integral structure (D) as an inorganic structural carrier.

(A) Cerium/Zirconium-Base Compound Oxide

Figure 2:
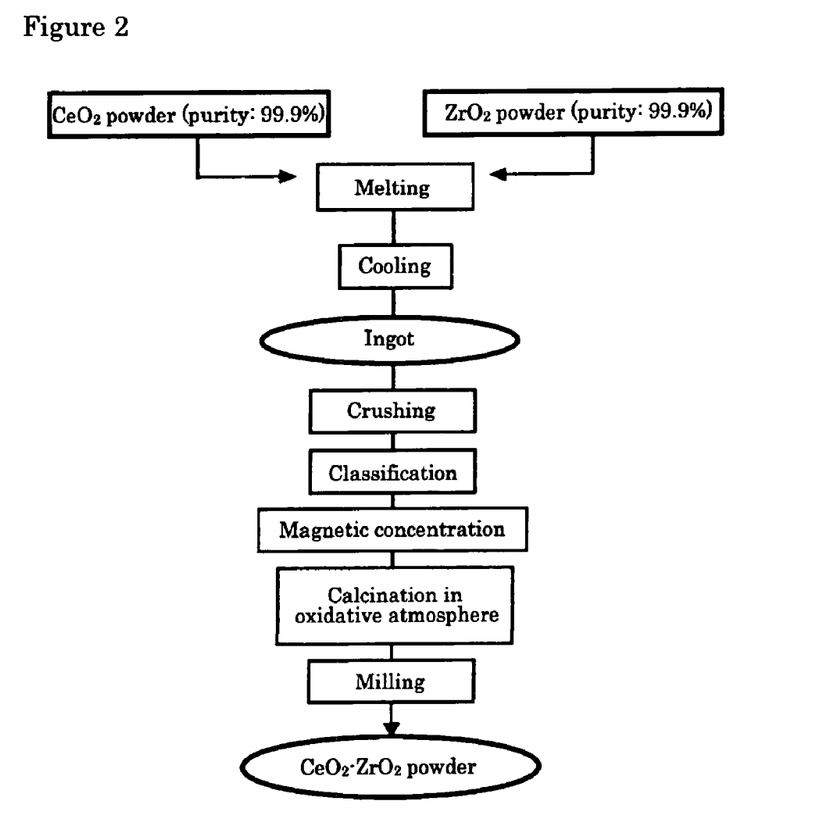
FIG. 2 is a flow sheet illustrating the steps for preparing the cerium/zirconium composite oxide as a component of the downstream-side catalyst for the present invention.

One method for producing the cerium/zirconium-base compound oxide (A) as a component of the catalyst of the present invention is described by referring to FIG. 2. It should be understood, however, that the method for producing the oxide (A) is not limited to the above.

The starting cerium material for the present invention is not limited, but is preferably cerium oxide. The cerium oxide may be produced from the nitrate, carbonate, sulfate, acetate, chloride, bromide or the like. The starting zirconium material for the present invention is also not limited but is preferably a zirconium element material-containing zirconium oxide, e.g., baddeleyite, desiliconized zirconia or zirconium oxide. The zirconium oxide may be produced from the nitrate, carbonate, sulfate, acetate, chloride, bromide or the like. The starting cerium and zirconium materials may be in the form of mixture or compound oxide containing these elements. Purity of the starting cerium and zirconium materials is not limited, but preferably 99.9% or more.

The elementary materials for the present invention are not limited, so long as at least one of them can be molten, when heated in the process for producing the compound oxide, described below. Each of the starting cerium and zirconium materials is preferably in the form of oxide. It is known that cerium oxide and zirconium oxide melt at high 2200° C. and 2720° C., respectively. However, they may be molten at below an oxide melting point when present in the mixture, because of the melting point depression effect. It may be incorporated with small quantities of nitrate, carbonate, sulfate, acetate, chloride or bromide of cerium or zirconium. The starting compound other than oxide may accelerate melting of the mixture in the compound oxide producing process.

A third component, e.g., flux, may be incorporated in trace quantities to depress melting point. Melting point of the starting mixture varies depending on ceria/zirconia molar ratio. More specifically, it is around 2600° C. at a $CeO_2/ZrO_2$ molar ratio of 1/9, around 2200° C. at 5/5 and around 2000° C. at 9/1.

When a third component other than cerium or zirconium material is used in combination with cerium and zirconium materials, it may be an alkali metal, alkali-earth metal or another metallic component within limits not harmful to characteristics of the OSC of the present invention. More specifically, it may be potassium, rubidium, cesium, magnesium, calcium, strontium, barium, antimony, hafnium, tantalum, rhenium, bismuth, praseodymium, neodymium, samarium, gadolinium, holmium, thulium, ytterbium, germanium, selenium, cadmium, indium, scandium, titanium, niobium, chromium, iron, silver, rhodium, platinum or the like. Such a third component may be present as an impurity originally present in the elementary cerium or zirconium material. It is preferable, needless to say, that such a third component is diminished or removed, when it is regulated as a hazardous material.

The starting cerium and zirconium materials are put in a melting apparatus, after being mixed with each other in a given ratio. The cerium and zirconium concentrations in the resulting cerium/zirconium-base compound oxide (A) are not limited. However, they are contained in a $[CeO_2/(ZrO_2+CeO_2)]$ molar ratio of 1/9 to 9/1, preferably 2/3 to 3/2 to secure high oxygen storage/release capacity and heat resistance.

The starting mixture is then molten in a melting apparatus. The method for melting the starting mixture is not limited, so long as it can melt at least one of the starting materials. It may be molten by an arc or high frequency thermoplasma apparatus or the like, of which an arc electric furnace as a common electrically melting apparatus is more preferable.

The starting cerium/zirconium mixture, when to be molten in an arc electric furnace, may be incorporated, as required, with a given quantity of coke as an electroconductive material to facilitate electricity distribution during the initial stage, depending on composition of the starting mixture. Subsequently, it is heated to 2400° C. or higher at, for example, a secondary voltage and average load power of 70 to 100 V and 80 to 100 kW, respectively. The starting mixture for the cerium/zirconium-base compound oxide (A) is preferably molten under heating for 0.5 to 3 hours. It can be molten uniformly when held for 0.5 hours or more after it is molten. The heating temperature may be 2000° C. or higher, preferably melting point of at least one of the starting materials or higher, particularly preferably 2600 to 2800° C. It is preferably held for 1 to 2 hours while being kept molten. The melting atmosphere is not limited. It may be molten in air or an inert gas atmosphere, e.g., nitrogen, argon or helium. The melting pressure is also not limited. It may be molten under atmospheric pressure or pressure, or under reduced pressure. The melting can be carried out generally under atmospheric pressure.

On completion of the melting, the molten mixture is slowly cooled for 20 to 30 hours in the electric furnace sealed with a carbon lid, to produce the ingot. The method for cooling the molten substance is not limited. However, it is normally cooled slowly in air to 100° C. or lower, preferably 50° C. or lower, after being withdrawn from the melting apparatus. This produces the ingot of cerium/zirconium-base compound oxide of uniform composition.

The ingot prepared by melting the starting mixture is then crushed. The way of ingot crushing is not limited, but it is preferable that the cerium/zirconium-base compound oxide (A) is crushed to have a diameter of 3 mm or less. The ingot can be crushed by an adequate machine, e.g., jaw crusher, roll crusher or the like. It is preferably crushed and classified to have a diameter of 1 mm or less to facilitate handling of the resulting powder in the subsequent steps.

The resulting powder is treated by magnetic concentration to remove impurities. Suboxides formed during the melting step and strains in the crystal formed as a result of supercooling can be removed by annealing in an oxidative atmosphere in an electric furnace or the like. The annealing conditions are not limited, so long as they can oxidize the ingot or the powder. It is carried out normally at 100 to 1000° C., preferably 600 to 800° C. Annealing time is not limited, but may be 1 to 5 hours, preferably 1 to 3 hours.

The powder may be further milled finely, depending on its purposes. The method for fine milling is not limited. It may be milled by an adequate machine, e.g., planetary mill, ball mill, jet mill or the like for 5 to 30 minutes. The cerium/zirconium-base compound oxide is preferably milled to an average diameter of 0.3 to 2.0 μm, particularly preferably 0.5 to 1.5 μm. Finely milled compound oxide can have a larger surface area and release oxygen in a low temperature range, although the mechanisms involved are not fully substantiated. The average particle diameter can be determined by an adequate analyzer, e.g., laser diffraction/scattering analyzer.

The above procedure produces the cerium/zirconium-base compound oxide (A) having a $CeO_2/(ZrO_2+CeO_2)$ molar ratio of 1/9 to 9/1.

Figure 3:
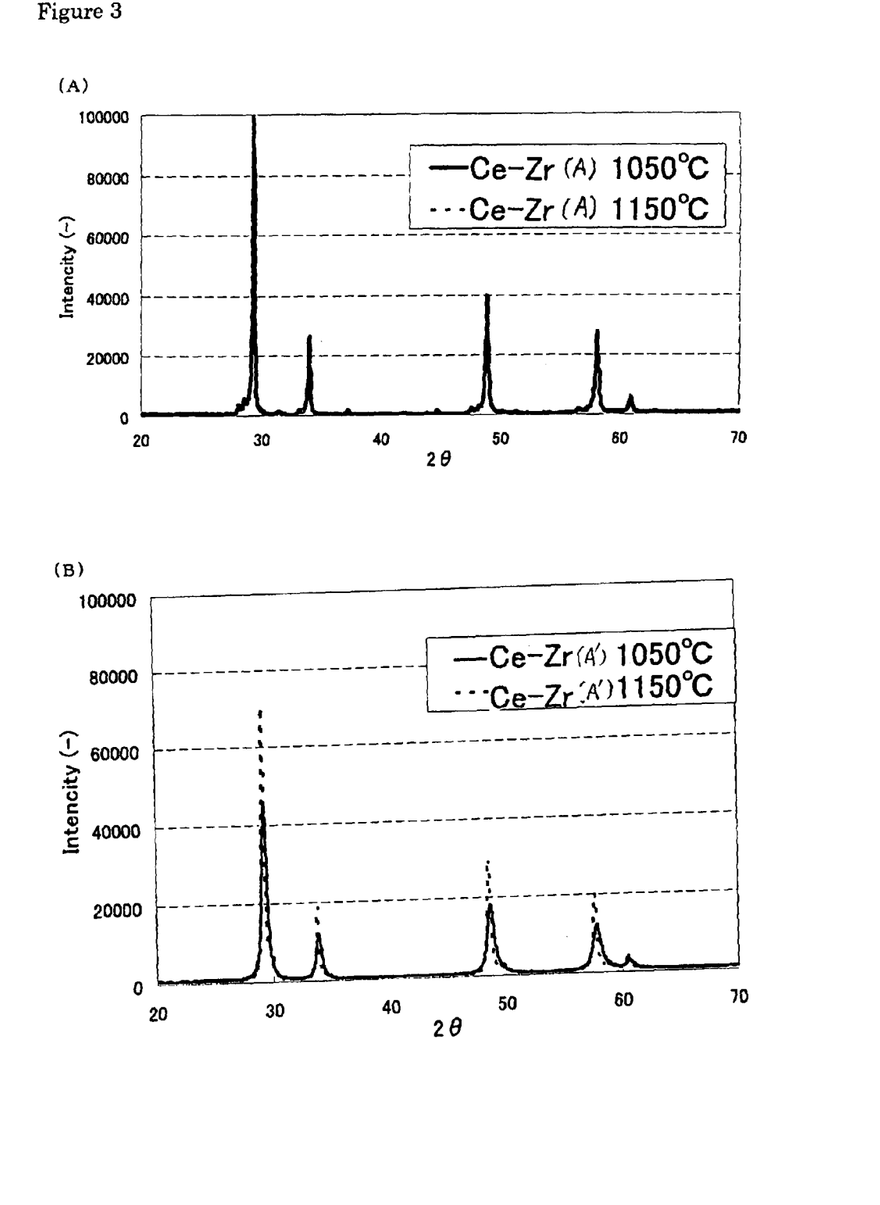
FIG. 3 shows the X-ray diffraction (XRD) patterns of the cerium/zirconium composite oxide before and after the durability test, illustrating the structural change by the test.

The cerium/zirconium-base compound oxide (A) is subjected to a durability test carried out under heating, to follow the structural changes before and after the test by an X-ray diffractometer (XRD). FIG. 3 (A) shows the XRD patterns of the sample. The samples calcined at high 1050° C. and 1150° C. in air have the main peaks (relevant to $Zr_{0.5}Ce_{0.5}O_2$) overlapping each other in a similar manner, from which it is apparent that the compound oxide is sufficiently stable to heat, and have a large crystalline structure, judging from sharpness of the peak.

FIG. 3 (B) shows the XRD patterns of a conventional compound disclosed by Patent Document 1 or the like, which is not molten under heating at a melting point of the starting mixture or higher, representing the structural changes before and after the durability test carried out under heating. The samples durability-tested at high 1050° C. and 1150° C. in air have the main peak (relevant to $Zr_{0.5}Ce_{0.5}O_2$) becoming sharper gradually, indicating that they undergo physical condition changes notably. Therefore, it is found to be apparently less stable to heat than the cerium/zirconium-base compound oxide for the present invention.

(B) Catalytic Active Metal

The catalytic active metal (hereinafter sometimes referred to as active metal species or metallic catalyst component) may be used individually for the present invention, but preferably supported on a porous inorganic oxide (C) as a base, because of improved stability to heat and atmosphere and also of improved activity. Hereinafter, a combination of the compound oxide (A), catalytic active metal (B), porous inorganic oxide (C) and so forth which constitute a catalyst is sometimes referred to as a catalyst composition.

The metallic catalyst component useful for the present invention is not limited, so long as it has an exhaust gas purification activity. However, the catalyst preferably contains at least one species of catalytically active metal selected from the group consisting of platinum, palladium and rhodium. It may further contain a transition metal, rare-earth metal or the like.

The transition metals useful for the present invention include iron, nickel, cobalt, zirconium and copper, and rare-earth metals useful for the present invention include lanthanum, praseodymium and neodymium. It may contain at least one species of transition metal, rare-earth metal or noble metal, e.g., gold or silver, as required.

The noble metal components preferably include rhodium as an essential component which is combined with at least one of platinum and palladium to improve NOx purification performance of the catalyst. The catalyst will have improved NOx purification performance, when used as a TWC. Rhodium is contained in the catalyst at 5 to 50% by weight, preferably 10 to 30% by weight based on the total noble metal components, the balance being at least one of Pd and Pt.

The catalyst of the present invention, when used as a TWC, is preferably incorporated with rhodium as a noble metal component. It conceivably promotes steam reforming reactions.

The steam reforming reactions for NOx purification are represented by the following formulae:

$$HC + H_2O \rightarrow COx + H_2 \quad (1)$$

$$H_2 + NOx \rightarrow N_2 + H_2O \quad (2)$$

Rhodium as an active metal promotes the steam reforming reactions, when used in combination with zirconium (WO2000/027508, Page 14), and it is known that this phenomenon is applicable to NOx purification. The similar mechanism will take place also in the present invention, at least partly.

It is accepted that rhodium is possibly poisoned by CO or the like to lose its activity, when exposed to exhaust gases. The cerium/zirconium-base compound oxide (A) efficiently oxidizes and removes reductive components, e.g., CO, which cause poisoning of the rhodium surface. This conceivably prevents deterioration of rhodium activity and contributes, at least partly, to NOx purification.

Quantity of the metallic catalyst component varies depending on types of active metal, inorganic base and structural carrier, catalyst purposes and so forth. When the metallic catalytic component is a noble metal to be spread on a carrier of integral structure, it is incorporated preferably at 0.01 to 20 g/L of the carrier of integral structure, particularly preferably 0.1 to 15 g/L. At above 20 g/L, the catalyst production cost may be excessive for the performance. At below 0.01 g/L, on the other hand, the catalyst may not fully exhibit the exhaust gas purification performance.

(C) Heat-Resistant Inorganic Oxide

The active metal species (B) is preferably supported on a heat-resistant inorganic oxide (hereinafter referred to as inorganic base, or simply to base) for the present invention.

The base on which the catalytically active component is supported is preferably of a porous inorganic material having a high heat resistance and a high specific surface area, selected from activated alumina (e.g., γ- or θ-alumina), zirconia, cerium/zirconium-base compound oxide, ceria, titanium oxide, silica and various types of zeolite. The porous inorganic base may be incorporated with a rare-earth element, e.g., lanthanum, cerium, barium or praseodymium, or an alkali-earth metal, e.g., strontium, for further improving heat resistance.

The base is preferably made of at least one species of material selected from the group consisting of zirconia, cerium/zirconium-base compound oxide, ceria, $\gamma$-$Al_2O_3$ and lanthanum doped $\gamma$-$Al_2O_3$. The particularly preferable catalyst has the active metal species (B) containing platinum, and the heat-resistant inorganic oxide (C) of lanthanum doped $\gamma$-$Al_2O_3$ for the catalyst. It is known that lanthanum doped $\gamma$-$Al_2O_3$ is highly resistant to heat, and, when impregnated with platinum, can maintain a high catalytic activity at high temperature (JP-A-2004-290827). The cerium/zirconium-base compound oxide (A), also highly resistant to heat, can make the catalyst composition of high stability at high temperature, when combined with lanthanum doped $\gamma$-$Al_2O_3$.

γ-alumina for the present invention preferably has a specific surface area (determined by BET method, same hereinafter) of 30 $m^2$/g or more, more preferably 90 $m^2$/g or more. γ-alumina having a specific surface area of 30 $m^2$/g or more can stably keep a noble metal highly dispersed. γ-alumina can be impregnated with a noble metal by a known method, e.g., drying and calcination of a mixture of γ-$Al_2O_3$ and an aqueous solution of metallic salt, e.g., chloroplatinic (IV) acid, platinum (II) nitrite diamine, amine solution of hydroxyplatinic acid, chloroplatinic acid, palladium dinitrodiamine, palladium nitrate, palladium chloride, rhodium (III) chloride or rhodium (III) nitrate.

The catalyst for the vehicle exhaust gas purification device of the present invention is preferably formed to take an integral structure, through which exhaust gases can pass. The catalysts of integral structure include a pelletized structure coated with a catalyst composition and pelletized catalyst composition, in addition to a carrier of integral structure, described below, coated with a catalyst composition.

(D) Carrier of Integral Structure

In the present invention, the second catalyst is supported on a carrier of integral structure (e.g., honeycomb structure) as an inorganic structural carrier.

Shape of the carrier of integral structure is not limited, and may be selected from known ones, flow-through type being more preferable when used for a TWC.

A carrier of integral structure may be made of a metal or ceramic material. Stainless steel is a common select as a metal for the carrier, which is generally in the form of honeycomb. The useful ceramic materials include cordierite, mullite, alumina, magnesia, spinel, silicon carbide and so forth, of which cordierite is more preferable for a honeycomb structure, because of its high formability, heat resistance and mechanical strength.

A carrier of integral structure may have another shape, e.g., sheet of knitted fine fibers, noncombustible felt-shape structure of relatively thick fibers, or the like. A carrier of integral structure composed of a fibrous component can have a higher treating capacity than others, because it can support a larger quantity of metallic catalyst component and a larger contact area with exhaust gases.

A flow-through type carrier of cordierite for TWCs for various reasons, e.g., production easiness, strength of the structure, controlled pressure loss because it can well pass exhaust gases therethrough (otherwise pressure loss will decrease as a result of the presence of the structural catalyst), and have increased quantity of catalytic composition which it supports and improved stability.

A carrier of integral structure may have an optional external shape, adequately selected from a cylinder with a circular or ellipsoidal cross-section, square column, hexagonal column and so forth suitable for an exhaust gas system in which it is mounted. Number of openings of a carrier of integral structure is adequately determined in consideration of type of exhaust gases, gas flow rate, pressure loss, purification efficiency and so forth. However, it is preferably about 10 to 1500/$inch^2$, when used for vehicle exhaust gas purification.

A honeycomb-shape carrier, e.g., of flow-through type, is structurally represented by cell density. The honeycomb structure (D) for the present invention has a cell density of 10 to 1500 cells/$inch^2$, particularly preferably is a flow-through type carrier having a cell density of 300 to 900 cells/$inch^2$. A carrier having a cell density of 10 cells/$inch^2$ or more can provide the catalyst of excellent purification performance, because it secures catalyst contact area necessary for exhaust gas purification and structural strength. A catalyst having a cell density of 1500 cells/$inch^2$ or less can sufficiently secure catalyst contact area while causing pressure loss to a limited extent and little deterioration of performance of the internal combustion engine for which the catalyst is used. It is preferable for a TWC for gasoline engines to be supported by a flow-through type carrier having a cell density of 300 to 900 cells/$inch^2$, viewed from controlled pressure loss.

In the present invention, the second catalyst is preferably supported on the honeycomb structure (D). More preferably, the catalyst composition is deposited in two layers on the honeycomb structure (D), the lower layer being incorporated with the cerium/zirconium-base compound oxide (A). Still more preferably, the cerium/zirconium-base compound oxide (A) is present together with Pt or Pd in the same layer. Moreover, the upper layer is substantially free of Pt or Pd but contains Rh for the catalyst to be used as a TWC.

The following reasons can be cited for supporting the structure of the catalyst of integral structure. It is known that Pt and Pd can react with Rh, when they are present in the same layer, to cause sintering of the noble metals with each other to deteriorate catalytic activities of Pt and Pd and exhaust gas purification capacity itself of the catalyst. It is also known that Pd may be poisoned by lead or sulfur present in exhaust gases to deteriorate activity of the catalyst of integral structure, when it is present in the catalyst surface layer. This problem may be solved by increasing noble metal contents, which, however, is accompanied by increased cost. Therefore, presence of Pt, Pd and Rh in the same layer is not preferable in some cases (JP-A-11-169712, paragraph 0011, and JP-A-2005-021793, paragraph 0005).

Moreover, the cerium/zirconium-base compound oxide (A) has a denser structure, due to the procedure by which it is prepared, than a cerium/zirconium-base compound oxide calcined at a temperature below its melting point, with the result that it tends to release oxygen relatively slowly. Pt and Pd, when simultaneously present in the cerium/zirconium-base compound oxide (A), promote utilization of oxygen stored by the compound oxide (A) by their catalytic activities, to activate the OSC capacity.

Moreover, Rh, when present in the upper layer in particular as the surface layer of the catalyst of integral structure, activates the catalyst NOx purification activity in the early stage. Therefore, the catalyst of integral structure preferably contains Rh disposed in the upper layer which directly comes into contact with exhaust gases, and Pt, Pd and the cerium/zirconium-base compound oxide (A) disposed in the lower layer.

The second catalyst preferably contains the cerium/zirconium-base compound oxide (A), active metal species (B) and heat-resistant inorganic oxide (C) at 5.0 to 200, 0.01 to 20 and 1 to 300 g per unit volume (L) of the carrier of honeycomb structure.

(Preparation of Catalyst)

The starting metallic catalyst component for the second catalyst for the present invention is prepared in the form of nitrate, sulfate, carbonate, acetate or the like. It is normally dissolved in water or an organic solvent for production of the catalyst, and mixed with at least one species of the base (C), on which the catalyst component is supported, and the cerium/zirconium-base compound oxide (A). The resulting mixture is dried at, e.g., 50 to 200° C. to remove the solvent, and then calcined at 300 to 1200° C. to produce the catalyst composition. It may be further incorporated with a known cerium/zirconium-base compound oxide or cerium oxide, in addition to the cerium/zirconium-base compound oxide (A).

The methods for supporting the catalytically active metal on the porous inorganic base include, in addition to calcining a mixture of the porous inorganic base and metallic salt solution, calcining a mixture of the compound oxide of the present invention and another component with an aqueous medium, after the mixture is spread on a carrier of integral structure; and calcining a mixture free of a metallic salt after it is spread on a carrier of integral structure and impregnating the coated carrier with a metallic salt solution. The catalytic component may be incorporated with a dispersant, pH adjustor or the like while it is mixed into a solution.

The catalyst for the exhaust gas purification device of the present invention may be further incorporated with a catalyst component of different function, promoter or binder depending on service conditions in which it works and purposes for which it is used.

The cerium/zirconium-base compound oxide (A) is preferably incorporated at 5 to 200 g per unit volume (L) of the carrier of integral structure, more preferably 35 to 100 g/L. The catalyst containing the compound oxide (A) at a content beyond the above range may fail to sufficiently exhibit its performance. At above 200 g/L, quantity of the compound oxide (A) may be excessive to cause clogging of the honeycomb structure while it is being coated with the catalyst component. At below 5 g/L, on the other hand, quantity of the compound oxide (A) may be insufficient.

The inorganic base (C) component is preferably incorporated at 1 to 300 g per unit volume (L) of the carrier of integral structure, more preferably 30 to 150 g/L. At above 300 g/L, quantity of the base (C) may be excessive together with the others to cause clogging of the honeycomb structure while it is being coated with the catalyst component, with the result that the catalyst may fail to sufficiently exhibit its performance. At below 1.0 g/L, on the other hand, the catalytic active species may not be dispersed in a sufficient quantity to keep a desired activity. Moreover, such a catalyst may fail to have sufficient durability.

The catalyst of integral structure for the present invention can be produced by the method described above, where a slurried mixture of the metallic catalyst components or precursors thereof, porous inorganic base described above or a precursor thereof and an aqueous medium is spread on the carrier of integral structure, dried and then calcined.

More specifically, a slurry is first prepared by mixing the porous inorganic base, starting metallic catalyst component materials and an aqueous medium in a given ratio. It is preferable for the present invention to incorporate the metallic catalyst components at 0.01 to 25 parts by weight per 100 parts by weight of the inorganic base. The aqueous medium is used in a quantity to uniformly disperse the porous inorganic base and metallic catalyst components in the slurry. The slurry may be spread on or under another catalyst composition layer.

The slurry may be incorporated with an acid or alkali for pH adjustment, or surfactant, resin or the like for improving slurry dispersibility. The slurry can have a uniform composition when treated by a ball mill or the like for mixing/milling, or another machine for milling or mixing.

Then, the slurried mixture is spread on the carrier of integral structure. The method for spreading the slurry is not limited, but wash coating is preferable. The slurry layer is then dried and calcined to produce the catalyst of integral structure on which the catalyst composition is supported. The drying temperature is preferably 100 to 300° C., more preferably 100 to 200° C. The calcination temperature is preferably 300 to 1200° C., more preferably 400 to 800° C., particularly preferably 400 to 600° C. The heating means may be selected from known ones, e.g., electric or gas oven.

3. First Catalyst

The first catalyst as the upstream-side catalyst for the present invention is not limited, but preferably has oxygen storage/release and NOx purification functions. Basically, it can have the same composition as the above-described second downstream-side catalyst and can be prepared in a similar manner, except that the cerium/zirconium-base compound oxide (A) is not essential.

For example, it preferably contains a cerium/zirconium-base complex oxide (A') which is prepared by calcining a starting mixture of cerium and zirconium salts at a temperature at which it is not molten, or cerium oxide. The method is not limited for producing a cerium/zirconium-base complex oxide (A') which is prepared by calcining a starting mixture of cerium and zirconium salts at a temperature at which it is not molten. For example, it can be produced by calcining and crushing after drying a mixed solution of a cerium and zirconium salts. It can be also prepared by a process involving coprecipitation. Moreover, the above-described method for producing the cerium/zirconium-base compound oxide (A) may be used partly or totally, except that the melting step is omitted. Cerium oxide is substantially pure, although acceptably contains one or more species of impurities derived from the starting material. The method for producing cerium oxide is not limited, and it may be produced by crushing after calcining a cerium salt. The cerium/zirconium-base compound oxide and cerium oxide may be supplied from the markets.

The upstream-side catalyst can contain one or more catalyst components described above as the ones for the downstream-side catalyst. More specifically, it can contain at least one active metal species (B) selected from the group consisting of platinum, palladium and rhodium. Moreover, it is preferable that the active metal species (B) is supported on at least one species of heat-resistant inorganic oxide (C) selected from the group consisting of zirconia, $\gamma$-$Al_2O_3$ and lanthanum doped $\gamma$-$Al_2O_3$, and that it is coating the honeycomb structure (D). The particularly preferable catalyst is of integral structure comprising a carrier of flow-through structure of cordierite, coated with the catalyst components. The carrier may be coated with a single layer of the catalyst components, or two or more layers each containing different catalyst components, where the above-described catalyst composition may be for the topcoat directly coming into contact with exhaust gases or the undercoat below the topcoat.

The first upstream-side catalyst preferably contains the cerium/zirconium-base compound oxide (A'), active metal species (B) and heat-resistant inorganic oxide (C) at 5.0 to 200, 0.01 to 20 and 1 to 300 g per unit volume (L) of the honeycomb structure (D), respectively.

4. Exhaust Gas Purification Method

The exhaust gas purification method of the present invention uses the above-described vehicle exhaust gas purification device, wherein exhaust gases discharged from an internal combustion engine are brought into contact with the catalysts disposed in the exhaust gas passage at least at 2 places orderly in the flow direction to decompose nitrogen oxides (NOx) present in the exhaust gases.

The catalyst system for the vehicle exhaust gas purification device of the present invention comprises, as described above, two or more exhaust gas purification catalysts including two different first and second catalysts, each supported on an inorganic structural carrier and disposed in an exhaust gas passage in the above order, wherein the second downstream-side catalyst contains the cerium/zirconium-base compound oxide (A), prepared by melting a starting mixture at its melting point or higher, the molten mixture being then cooled to produce an ingot and crushed.

At least two catalysts are preferably disposed adjacently. At least the second downstream-side catalyst contains the cerium/zirconium-base compound oxide (A) working as an OSC, prepared by melting a starting mixture at its melting point or higher, the molten mixture being then cooled to produce an ingot and crushed.

The exhaust gas purification method of the present invention passes exhaust gases through the upstream- and downstream-side catalysts to purify NOx present in the exhaust gases, these catalysts particularly preferably being disposed adjacently in the exhaust gas passage.

It exhibits an excellent NOx purification effect, in particular when the catalyst works as a TWC for vehicle exhaust gas purification device, particularly noted for exhaust gases in a lean condition evolving as a result of air/fuel ratio fluctuations. The exhaust gas purification devise preferably works at the theoretical air/fuel ratio or in an atmosphere with an air/fuel ratio changed from a rich to a lean state for exhaust gases discharged from a gasoline engine as an internal combustion engine. The exhaust gas purification device, when used as a TWC device, purifies nitrogen oxides (NOx) by reduction with hydrocarbons (HC), carbon monoxide (CO) or hydrogen (H) produced by steam reforming. Each catalyst is preferably of an integral structure, prepared by the method described above.

The exhaust gas purification method of the present invention exhibits characteristic effects when used in varying air/fuel ratio conditions resulting from lean conditions frequently occurring in an engine frequently operating in fuel-cut conditions.

Fluctuations of air/fuel ratio in an internal combustion engine lead to changed HC concentration in exhaust gases. The changed HC concentration is considered to provide a favorable atmosphere for the present invention to exhibit a high exhaust gas purification capacity, some of the reasons for which are considered to result from the following phenomena, although not fully substantiated.

One of the preferred embodiments of the exhaust gas purification device of the present invention comprises a TWC for each of the upstream- and downstream-side catalysts, where the upstream-side TWC contains a cerium/zirconium-base compound oxide prepared at below the melting point. Such a compound oxide is known as an OSC, which can have a higher purification capacity as a TWC for reducing HC and CO than the downstream-side TWC for the following reasons.

The OSC as the upstream-side TWC, containing the cerium/zirconium-base compound oxide (A') prepared at a relatively low temperature, has a larger specific surface area in many cases than the cerium/zirconium-base compound oxide (A) prepared at a higher temperature. Therefore, the OSC tends to have a higher activity, in particular oxidation activity, coming form a larger active area of the compound oxide (A').

The cerium oxide and cerium/zirconium-base compound oxide particles are considered to provide the oxygen storage/release area limited to a certain depth from the particle surfaces for the OSC, by which is meant that an OSC having a larger specific surface area contains a larger quantity of the component effectively working for oxygen storage/release. An OSC having a larger specific surface area as the upstream-side TWC tends to have a higher activity than the downstream-side TWC. In other words, the preferred embodiment of the exhaust gas purification device of the present invention disposes the upstream-side catalyst having a higher purification capacity than the downstream-side catalyst.

The downstream-side catalyst for the present invention comprises, as a catalyst component, a cerium/zirconium-base compound oxide prepared by melting a starting mixture of cerium and zirconium components, preferably cerium oxide and zirconium oxide, the molten mixture being then cooled and crushed. By contrast, each of the conventional catalysts (as OSC material) disclosed by Patent Document 1 contains a compound oxide prepared by calcining a mixture of a cerium and zirconium salts at 1000° C. or lower, or 1300° C. or lower at the highest. It is amazing that a combination of a catalyst of seemingly high activity and another one not considered to have a high activity viewed from their specific surface areas exhibit a characteristic NOx purification performance and provides a more excellent exhaust gas purification device.

The design of the vehicle exhaust gas purification device of the present invention may be modified, as required, to include a catalyst having a function similar to that of the upstream-side catalyst or having a completely different function as a catalyst disposed downstream of the downstream-side catalyst, in addition to a combination of the upstream-side and downstream-side catalysts described above.

The atmosphere in which HC concentration in exhaust gases varies is not limited to the above. For example, such an atmosphere may evolve in selective catalytic reduction with HC(HC—SCR), where NOx purification is effected with HC as a reductant for exhaust gases discharged from diesel engines. HC-SRC tries to purify NOx present in exhaust gases produced in a lean combustion condition using HC as a reductant, where the HC may be derived from a fuel supplied to a combustion chamber at an air/fuel ratio temporarily decreased to increase HC concentration in exhaust gases, or from a fuel directly injected into exhaust gases.

The present invention uses the catalyst of cerium/zirconium-base compound oxide (A) not individually but in combination with one or more catalysts, which is now a common practice for vehicle exhaust gas purification. Therefore, it needs no catalyst layout newly designed, and is applicable to vehicles commercialized now or in the future.

The working conditions in which it is used include those associated with a TWC and HC-SCR, described above. Therefore, it is applicable to purification of NOx in exhaust gases discharged from widely varying vehicles. The present invention, although preferably used for purification of exhaust gases discharged from gasoline engines, can purify exhaust gases discharged from various vehicle internal combustion engines burning a fossil fuel, e.g., diesel fuel or LPG, and from boilers, gas turbines and so forth.

EXAMPLES

The characteristics of the present invention are described more clearly by Examples and Comparative Example. It is however to be understood that the embodiments of the present invention are not limited by Examples. Each catalyst component was prepared by the procedures described below.

[Cerium/Zirconium-Base Compound Oxide (A)]

High-purity zirconium oxide (purity: 99.9%) and cerium oxide (purity: 99.9%) were used as the starting Zr and Ce materials to prepare the cerium/zirconium-based compound oxide powder for the present invention, following the production process procedure illustrated in FIG. 2. First, 4.2 kg of high-purity zirconium oxide and 5.8 kg of high-purity cerium oxide were mixed to prepare 10 kg of the powder. The mixture was molten at 2200° C. or higher for 110 minutes in an arc type electric furnace under the conditions of secondary voltage: 85 V, average load power: 99.5 kW and total work load: 182 kWh.

Coke (500 g) was put in the mixture to facilitate electricity distribution during the initial stage. On completion of the melting, the molten mixture is slowly cooled in air for 24 hours in the furnace sealed with a carbon lid to prepare the ingot, which was crushed by a jaw crusher and roll crusher to a particle diameter of 3 mm or less, and then sieved to prepare the powder having a particle diameter of 1 mm or less.

The powder was then annealed at 800° C. for 3 hours in air in an electric furnace to remove suboxides formed during the melting step and strains in the crystal formed as a result of supercooling. It was then milled by a planetary mill for 10 minutes to prepare the powder having an average particle diameter of 1.3 μm. The average particle diameter was determined by a laser diffraction/scattering analyzer (LS230, COULTER Co., LTD.). The product is hereinafter sometimes referred to as Ce—Zr (A).

[Cerium/Zirconium-Base Compound Oxide (A')]

Each of commercial cerium nitrate (purity: 99.0%) and zirconium oxynitrate (purity: 99.0%) was dissolved in ion-exchanged water to prepare an aqueous solution containing cerium or zirconium at 20 or 25% by weight, as $CeO_2$ or $ZrO_2$.

These nitrate solutions were mixed with each other in quantities necessary for producing a compound oxide containing $CeO_2$ and $ZrO_2$ at 58 and 42% by weight. The resulting mixture was incorporated with a 5% aqueous ammonia solution and adjusted at a pH of 10.2 in the final stage to coprecipitate cerium hydroxide and zirconium hydroxide.

The resulting coprecipitate was filtered under a vacuum, washed with pure water, and calcined at 1000° C. for 3 hours to prepare the cerium/zirconium-base compound oxide. It was treated in a manner similar to that for producing Ce—Zr (A) to prepare the cerium/zirconium-base compound oxide of non-molten type, having a particle diameter of 2.0 μm or less. The product is hereinafter sometimes referred to as Ce—Zr (A').

[γ-Alumina Impregnated with Noble Metal]

Commercial lanthanum doped γ-alumina (specific surface area: 220 $m^2$/g, $Al_2O_3$/$La_2O_3$ mass ratio: 98.4/1.6) is impregnated with a 20% by weight aqueous solution of platinum (II) nitrite diamine or 8% by weight aqueous solution of rhodium nitrate, and dried to remove water, to produce a platinum-impregnated catalyst component powder. The product is hereinafter sometimes referred to as La-γ-alumina. For palladium, a 28% by weight aqueous solution of palladium dinitrodiamine was used for impregnation. Other components of zirconia and ceria were commercial products, both 99.9% pure.

Example 1

The above catalyst material was adjusted to have a composition necessary for coating a carrier of integral structure with a given quantity of the catalyst per unit volume of the carrier. It was mixed by ball-mill in the presence of an adequate quantity of aqueous medium for 5 hours to prepare the catalyst slurry. A carrier of integral structure was coated by wash coating with two layers, the first and second layers formed in this order from the carrier with the slurries of different composition. The coated carrier was dried and calcined at 500° C. for 1 hour to prepare the catalyst of integral structure. The content of each catalyst component in each of the layers is given in Table 2, where unit of the content is g/unit volume (L) of the carrier.

[Carrier of Integral Structure]

Type of catalyst of integral structure: Flow-through type carrier

Volume of catalyst of integral structure: 645 cc (95 mm high and 93 mm in diameter)

Material of carrier of integral structure: Cordierite

Cell density of catalyst of integral structure: 600 cells/$inch^2$

Cell wall thickness of catalyst of integral structure: 4 mil

Example 2

The above catalyst material was adjusted to have a composition necessary for coating a carrier of integral structure with a given quantity of the catalyst per unit volume of the carrier. It was mixed by ball-mill in the presence of an adequate quantity of aqueous medium for 5 hours to prepare the catalyst slurry. A carrier of integral structure was coated with the slurry by wash coating in the same manner as in Example 1, except that the carrier was coated with one layer instead of two layers. The content of each catalyst component in each of the layers is given in Table 2, where unit of the content is g/unit volume (L) of the carrier.

A TWC was prepared with two catalysts, both containing the cerium/zirconium-base compound oxide (A) prepared by the procedure used in Example 1, which involved melting of the compound at a high temperature. However, it failed to achieve a target NOx purification rate. Then, another TWC was prepared with the above catalyst as the downstream-side catalyst (refer to Table 2) and a conventional TWC catalyst as the upstream-side catalyst (refer to Table 1). The catalyst prepared in Example 2 was also used as the downstream-side catalyst (refer to Table 2) and a conventional TWC catalyst was used as the upstream-side catalyst (refer to Table 1). An exhaust gas purification catalyst device, illustrated in FIG. 1, in which the above TWCs were mounted, was evaluated for performance of the TWCs under the following conditions.

Figure 4:
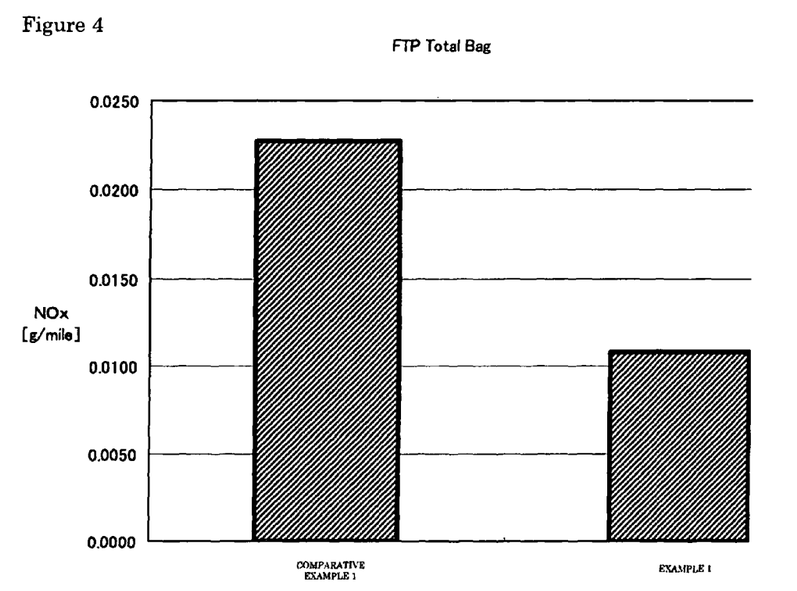
FIG. 4 shows purification performance of the vehicle exhaust gas purification device of the present invention for purification of NOx present in exhaust gases.
Figure 6:
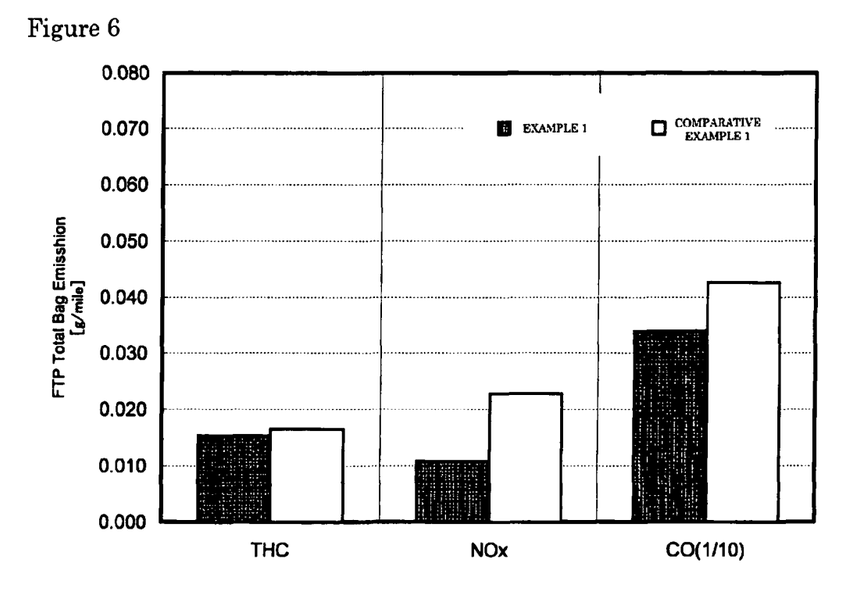
FIG. 6 shows purification performances of the vehicle exhaust gas purification device of the present invention for purification of THC, NOx and CO present in exhaust gases.

[Evaluation Conditions]
Engine used for evaluation: NA 2.4 L, Gasoline engine
Measurement mode: Federal Test Procedure (FTP) mode, a running test mode established by the US's Environment Protection Agency for evaluation of exhaust gas purification performance
Exhaust gas analyzer: HORIBA, MEXA7000
Catalyst position: Underfloor FIG. 4 shows NOx purification performance, and FIG. 6 shows NOx, HC and CO purification performances, all of the total bag results observed in the FTP mode. The device prepared in Example 2 abated NOx to 0.015 g/mile (not shown), thus failing to exhibit NOx purification performance as high as that prepared in Example 1.

In FIG. 6, the axis of ordinate represents weight of each component in the total bags (3 bags) in each run, where "THC" means a total hydrocarbon weight and "CO (1/10)" means a CO weight in the total bags, multiplied by 1/10 for convenience.

Figure 5:
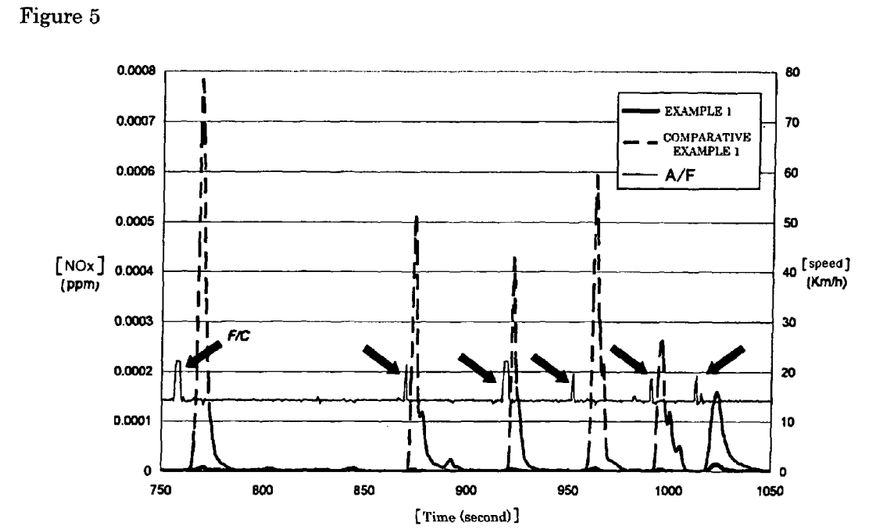
FIG. 5 shows the relation between fuel-cut timing and NOx purification performance.

FIG. 5 shows the relation between fuel-cut timing and NOx purification performance, where the fuel-cut point is indicated by an arrow and "F/C" means fuel-cut.

TABLE 1

|  |  | Upstream-side catalyst | |
|---|---|---|---|
|  |  | First layer (g/L) | Second layer (g/L) |
| Active metal(s) | Pd | 3 | 6 |
|  | Rh | 0.6 | — |
| Heat-resistant inorganic material | La-γ-alumina | 80 | 33 |
|  | Zirconia | — | — |
| Ce—Zr (A') |  | 35 | 20 |
| Ce—Zr (A) |  | — | — |
| Ceria |  | — | — |

TABLE 2

|  |  | Downstream-side catalyst (Example 1) | | (Example 2) | Downstream-side catalyst (Comparative Example 1) | |
|---|---|---|---|---|---|---|
|  |  | First layer (g/L) | Second layer (g/L) |  | First layer (g/L) | Second layer (g/L) |
| Active metal(s) | Pd | 1.2 | — | 1.2 | 1.2 | — |
|  | Rh | — | 0.4 | 0.4 | — | 0.4 |
| Heat-resistant inorganic material | La-γ-alumina | 39 | — | 39 | 40 | 25 |
|  | Zirconia | — | 30 | — | — | 25 |
| Ce—Zr (A') |  | 77 | — | 77 | — | — |
| Ce—Zr (A) |  | — | 30 | — | — | 10 |
| Ceria |  | — | — | — | 77 | — |

Comparative Example 1

A catalyst was prepared in the same manner as in Example 1, except that the downstream-side catalyst (Table 2) contained the cerium/zirconium-base compound oxide (A'), calcined at a low temperature, where the upstream-side catalyst is the conventional TWC (Table 1) as in Example 1.

An exhaust gas purification catalyst device, in which the above TWCs were mounted, was evaluated for performance of the TWCs.

The results are given in FIGS. 4 to 6, together with the results observed in Example 1.

FIG. 4 shows NOx purification performance, and FIG. 6 shows NOx, HC and CO purification performances, all of the total bag results observed in the FTP mode.

In FIG. 6, the axis of ordinate represents weight of each component in the total bags (3 bags) in each run, where "THC" means a total hydrocarbon weight and "CO (1/10)" means a CO weight in the total bags, multiplied by 1/10 for convenience.

FIG. 5 shows the relation between fuel-cut timing and NOx purification performance, where the fuel-cut point is indicated by an arrow and "F/C" means fuel-cut.

(Evaluation Results)

The exhaust gas purification device prepared in Example 1 exhibited high NOx purification performance, as shown in FIG. 4, by virtue of the downstream-side catalyst which contained the cerium/zirconium-base compound oxide (A) prepared by the procedure involving melting of the compound at a high temperature. At the same time, it exhibited higher HC, CO and NOx purification performances, as shown in FIG. 6, than the one prepared in Comparative Example 1. It was also observed that the device prepared in Example 1 exhibited higher function/effect for purification of NOx present in exhaust gases even after a fuel was cut than the one prepared in Comparative Example 1 (FIG. 5). The device prepared in Example 2 abated NOx much more than the one prepared in Comparative Example 1, but the effect was not as high as that of the device prepared in Example 1.

What is claimed is:

1. A catalyst system for an vehicle exhaust gas purification device comprising two or more exhaust gas purification catalysts including two different exhaust gas purification catalysts (first and second catalysts), each supported on an inorganic structural carrier and disposed in an exhaust gas passage in the above order, wherein
the first catalyst is located on the upstream side, and
the second downstream-side catalyst contains a cerium/zirconium-base compound oxide (A), prepared by melting a starting mixture at its melting point or higher, the molten mixture being then cooled to produce an ingot and crushed,
wherein:
the first catalyst contains a cerium/zirconium complex oxide (A') which is prepared by calcining a starting mixture of cerium and zirconium salts at a temperature at which it is not molten;
the second catalyst further contains at least one active metal species (B) selected from the group consisting of platinum, palladium and rhodium;
the active metal species (B) is supported by at least one species of heat-resistant inorganic oxide (C) selected from the group consisting of zirconia, γ-$Al_2O_3$ and lanthanum doped γ-$Al_2O_3$; and
the inorganic structural carrier of the second catalyst is of a honeycomb structure (D), and the honeycomb structure (D) supports the cerium/zirconium-base compound oxide (A), active metal species (B) and heat-resistant inorganic oxide (C) as the second catalyst components at 5.0 to 200, 0.01 to 20 and 1 to 300 g per unit volume (L) of the structure (D), respectively.

2. The catalyst system according to claim 1, wherein the first and second catalysts are disposed adjacently.

3. The catalyst system according to claim 1, wherein each of the first and second catalysts has a function of reducing nitrogen oxides (NOx) with hydrocarbons (HC), carbon monoxide (CO) or hydrogen (H).

4. The catalyst system according to claim 1, wherein the starting mixture for the cerium/zirconium-base compound oxide (A) is molten under heating for 0.5 to 3 hours.

5. The catalyst system according to claim 1, wherein the cerium/zirconium-base compound oxide (A) has a particle diameter of 3 mm or less.

6. The catalyst system according to claim 1, wherein the cerium/zirconium-base compound oxide (A) contains cerium and zirconium in a $CeO_2/(ZrO_2+CeO_2)$ molar ratio of 1/9 to 9/1.

7. The catalyst system according to claim 1, wherein the active metal species (B) is supported by at least one species of heat-resistant inorganic oxide (C) selected from the group consisting of zirconia, $\gamma$-$Al_2O_3$ and lanthanum doped $\gamma$-$Al_2O_3$.

8. The catalyst system according to claim 7, wherein the active metal species (B) contains platinum and the heat-resistant inorganic oxide (C) is composed of lanthanum doped $\gamma$-$Al_2O_3$.

9. The catalyst system according to claim 1, wherein the second catalyst is deposited at least in 2 layers on the honeycomb structure (D), the lower layer being incorporated with the cerium/zirconium-base compound oxide (A).

10. The catalyst system according to claim 1 or 9, wherein the honeycomb structure (D) is a carrier of flow-through type having a cell density of 10 to 1500 cells/inch$^2$.

11. The catalyst system according to claim 1, wherein the first catalyst further contains at least one active metal species (B) selected from the group consisting of platinum, palladium and rhodium.

12. The catalyst system according to claim 11, wherein the active metal species (B) is supported on at least one species of heat-resistant inorganic oxide (C) selected from the group consisting of zirconia, cerium/zirconium-base compound oxide, ceria, $\gamma$-$Al_2O_3$ and lanthanum doped $\gamma$-$Al_2O_3$.

13. The catalyst system according to one of claims 11 to 12, wherein the honeycomb structure (D) supports the cerium/zirconium-base compound oxide (A'), active metal species (B) and heat-resistant inorganic oxide (C) as the first catalyst components at 5.0 to 200, 0.01 to 20 and 1 to 300 g per unit volume (L) of the structure (D), respectively.

14. A vehicle exhaust gas purification device which uses the catalyst system according to one of claims 1-6, 7, 8, 9, 10 and 11-13.

15. An exhaust gas purification method using the vehicle exhaust gas purification device according to claim 14, wherein exhaust gases discharged from an internal combustion engine are brought into contact with the catalysts disposed in the exhaust gas passage at least at 2 places orderly in the flow direction to decompose nitrogen oxides (NOx) present in the exhaust gases.

16. The method according to claim 15 for exhaust gas purification, wherein nitrogen oxides (NOx) are reduced with hydrocarbons (HC) or carbon monoxide.

17. The method according to claim 15 for exhaust gas purification, wherein the internal combustion engine is a gasoline engine.

* * * * *